US007291070B2

(12) United States Patent
Gatto et al.

(10) Patent No.: US 7,291,070 B2
(45) Date of Patent: Nov. 6, 2007

(54) METHODS AND SYSTEMS FOR ELECTRONIC VIRTUAL RACES

(75) Inventors: Jean-Marie Gatto, London (GB); Pierre-Jean Beney, London (GB)

(73) Assignee: Cyberview Technology, Inc., Palo Alto, CA (US)

( * ) Notice: Subject to any disclaimer, the term of this patent is extended or adjusted under 35 U.S.C. 154(b) by 0 days.

(21) Appl. No.: 10/389,463

(22) Filed: Mar. 13, 2003

(65) Prior Publication Data

US 2003/0171140 A1 Sep. 11, 2003

Related U.S. Application Data

(62) Division of application No. 09/838,563, filed on Apr. 19, 2001, now Pat. No. 6,921,331.

(51) Int. Cl.
*G06F 19/00* (2006.01)

(52) U.S. Cl. ........................................ 463/42; 709/217

(58) Field of Classification Search .................... 463/1, 463/16-20, 13, 40-42; 273/138.1, 143 R, 273/246; 709/200, 217, 220-222, 246, 250
See application file for complete search history.

(56) References Cited

U.S. PATENT DOCUMENTS 3,645,531 A 2/1972 Wright
3,729,193 A 4/1973 Labis
5,411,258 A 5/1995 Wilson et al.
5,411,259 A 5/1995 Pearson
5,564,701 A 10/1996 Dettor
5,743,525 A 4/1998 Haddad
5,795,226 A 8/1998 Yi
5,938,200 A 8/1999 Markowicz
5,971,855 A * 10/1999 Ng .............................. 463/42
5,997,400 A 12/1999 Seelig
6,089,981 A 7/2000 Brenner et al.
6,117,009 A 9/2000 Yoseloff
6,118,860 A 9/2000 Hillson
6,135,884 A 10/2000 Hedrick et al.
6,135,887 A 10/2000 Pease et al.
6,152,822 A 11/2000 Herbert
6,159,095 A 12/2000 Frohm et al.
6,165,070 A * 12/2000 Nolte et al. ................... 463/20
6,178,510 B1 * 1/2001 O'Connor et al. ............. 726/5
6,196,920 B1 * 3/2001 Spaur et al. .................. 463/42
6,233,565 B1 5/2001 Lewis
6,280,324 B1 8/2001 Tenenbaum
6,331,143 B1 12/2001 Yoseloff
6,358,150 B1 3/2002 Mir
6,450,887 B1 9/2002 Mir
6,645,077 B2 * 11/2003 Rowe .......................... 463/42
6,749,510 B2 6/2004 Giobbi
2002/0107072 A1 * 8/2002 Giobbi ........................ 463/42

(Continued)

*Primary Examiner*—Scott Jones
(74) *Attorney, Agent, or Firm*—Young Law Firm, P.C.

(57) ABSTRACT

A game of chance includes steps of accepting at least one of a wager and a selection of a predicted outcome of a competitive activity; randomly selecting an actual outcome of the competitive activity according to predetermined odds; accessing one of a plurality of video sequence that shows the randomly selected actual outcome of the competitive activity, and showing the accessed one of the plurality of video sequence on a display. A step may be carried out to pay a sum determined by the wager and the predetermined odds when the predicted outcome matches the randomly selected actual outcome.

32 Claims, 5 Drawing Sheets

U.S. PATENT DOCUMENTS

| | | | | |
|---|---|---|---|---|
| 2002/0132658 | A1 | 9/2002 | Brown | |
| 2002/0138594 | A1 * | 9/2002 | Rowe | 709/219 |
| 2002/0142846 | A1 * | 10/2002 | Paulsen | 463/43 |
| 2003/0228912 | A1 * | 12/2003 | Wells et al. | 463/43 |

* cited by examiner

| Horse Number | Odds | Odds | Payoff for 1£ stake | Chance to win | Number of movies |
|---|---|---|---|---|---|
| 1 | 6/4 | 1.5 | 2.5 | 28.0% | 22 |
| 2 | 4/1 | 4 | 5 | 14.0% | 11 |
| 3 | 5/2 | 2.5 | 3.5 | 20.0% | 16 |
| 4 | 9/2 | 4.5 | 5.5 | 12.7% | 10 |
| 5 | 16/1 | 16 | 17 | 4.1% | 3 |
| 6 | 6/1 | 6 | 7 | 10.0% | 8 |
| 7 | 8/1 | 8 | 9 | 7.8% | 6 |
| 8 | 12/1 | 12 | 13 | 5.4% | 4 |

METHODS AND SYSTEMS FOR ELECTRONIC VIRTUAL RACES

CROSS-REFERENCE TO RELATED APPLICATIONS

The present application is a divisional of U.S. Ser. No. 09/838,563 filed Apr. 19, 2001 now U.S. Pat. No. 6,921,331 and assigned to the assignee of the present application.

BACKGROUND OF THE INVENTION

1. Field of the Invention

The invention generally pertains to the field of electronic gaming. More particularly, the present invention relates to electronic games of chance where the skill and/or knowledge of the player has no effect upon the outcome of the game.

2. Description of the Related Art

Electronic games are popular forms of entertainment the world over. Some of these games enable wagers to be placed on the outcome of the game and a payout to be made based upon predetermined odds. Horse, dog and auto racing are but a few examples of sports on which wagering is commonplace. Traditionally, however, players rely upon their knowledge of the sport, the perceived strengths and weaknesses of individual entrants in the races and hunches to select the entrant on which to place a wager. Some electronic games drawn to simulating such races rely upon historical information and aim to provide the player with the same information he or she would have had if that person had physically attended the actual race. An example of such an electronic game is detailed in U.S. Pat. No. 5,411,259. However, such a gaming model is believed to be rather inflexible and inherently limited, in that the historical information must be collected, properly formatted, stored and presented to the player before any game can begin. This is believed to be an expensive and slow process that may prove to be unduly burdensome to the game owner and/or operator. Some localities, moreover, do not allow gaming activities that draw in any measure upon the skill and/or knowledge of the player.

SUMMARY OF THE INVENTION

It is, therefore, an object of the present invention to provide improved entertainment systems, devices and games that are easily and inexpensively implemented and that may be readily updated as new content is developed. It is another object of the present invention to provide systems, devices and methods that simulate actual races and that provide the player with a measure of the excitement and anticipation that is inherent in actual races. It is a still further object of the present invention to provide a novel game of pure chance that draws upon the running of virtual races in any one of a number of competitive activities to actively involve the player.

In accordance with the above-described objects and those that will be mentioned and will become apparent below, an electronic interactive entertainment system comprises a display; a library of selectably accessible video sequences, the library including a plurality of activity sets, each activity set of the plurality of activity sets being associated with an activity, each activity set including a plurality of sequentially numbered subsets, each numbered subset including a plurality of like numbered video sequences drawn to the associated activity; a player interaction means, the player interaction means being configured to enable selection of at least an activity, a predicted numbered outcome of the activity and a wager on the predicted numbered outcome; a random number generator, and a processor, the processor being configured to access the library and to select an activity set associated with the activity selected by the player and to select one of the sequentially numbered subsets according to a selected number generated by the random number generator and to access and show one of the plurality of like numbered video sequences of the selected subset on the display.

The player interaction means may be further configured to pay a predetermined sum when the predicted numbered outcome matches an actual outcome of the activity shown in the accessed one of the plurality of like numbered video sequences of the selected subset. The library may be stored remotely from the player interaction means and wherein the library is accessed over a computer network. Alternatively, the library may be stored locally relative to the processor. The locally stored library may be coupled to a computer network to enable remote updating of the library over the network. The associated activity may be a competitive activity in which a single numbered entrant may be declared the winner. The entrant may include a human, an animal and/or a machine, for example. For example, the numbered entrant may be a team and the associated activity may include a sport such as a race. The predetermined sum may be determined according to the wager and predetermined odds. The library may include an introductory video sequence for each activity set and the system may be configured to show the introductory video sequence on the display immediately prior to the accessed one of plurality of like numbered video sequences.

The player interaction means may be disabled when the introductory video sequence may be shown on the display. The player interaction means may include a button, a pointing device, an electronic card reader, a coin input slot, a paper money input slot, a barcode reader, a scanner, a payout slot and/or a receipt printer, for example.

The present invention is also a game of chance, comprising the steps of presenting a player with a selection of activities; accepting from the player a selected activity, a predicted outcome of the activity and a wager; randomly selecting an actual outcome of the selected activity according to predetermined odds; a first showing step to show the player an introductory video sequence of the selected activity; and a second showing step to show the player a selected video sequence of the randomly selected actual outcome of the activity immediately after the introductory video sequence.

The game may further include a step of paying the player a sum determined by the wager and the predetermined odds when the outcome predicted by the player matches the selected actual outcome. The selected actual outcome is preferably independent of the predicted outcome and of any action or knowledge of the player. No further wager may be accepted from the player after the introductory video sequence is displayed to the player.

The choice of activities may include a race, such as a horse race, a dog race, a swimming race, a skiing race, a car race, a motorcycle race, a bicycle race and/or a boat race, for example. The second showing step may include a step of selecting a video sequence of the selected outcome from a plurality of different video sequences drawn to a same outcome as the selected actual outcome.

The present invention is also a machine-readable medium having data stored thereon representing sequences of instructions which, when executed by a computing device, causes said computing device to enable a player to play a game of chance, by performing the steps of presenting the player with a selection of activities; accepting from the player a selected activity, a predicted outcome of the activity and a wager; randomly selecting an actual outcome of the selected activity according to predetermined odds; a first showing step to show the player an introductory video sequence of the selected activity, and a second showing step to show the player a selected video sequence of the selected actual outcome of the activity immediately after the introductory video sequence.

The present invention may also be viewed as an electronic interactive entertainment system, comprising a display; a plurality of selectably accessible video sequences, each video sequence of the plurality of video sequences showing at least one numbered entrant of a competitive activity at least one of placing in and winning the competitive activity; a player interaction means, the player interaction means being configured to enable selection of at least a predicted numbered outcome of the competitive activity and a wager on the predicted outcome; a random number generator configured to generate a random number within a predetermined range, and a processor, the processor being configured to select, based on the generated random number, one of the plurality of video sequences and to cause the selected one of the plurality of video sequences to be shown on the display.

The player interaction means may be further configured to carry out a predetermined action when a number of the predicted outcome matches a number of the entrant shown in the selected one of the plurality of video sequences. The predetermined action may include payment of a predetermined sum, which may be determined by the wager and odds associated with the numbered entrant shown in the selected one of the plurality of video sequences.

The plurality of video sequences may be stored remotely from the player interaction means and accessed over a computer network. Alternatively, the plurality of video sequences may be stored locally relative to the processor. The locally stored plurality of video sequences may be coupled to a computer network to enable remote updating of the plurality of video sequences over the network.

The entrant may include a human, an animal, a machine, and/or a team. The competitive activity may include a sport and may include a race, for example. The system may include an introductory video sequence and the system may be configured to show the introductory video sequence on the display immediately before showing the selected one of the plurality of video sequences on the display. The system may further be configured to disable the player interaction means when the introductory video sequence may be shown on the display. The player interaction means may include a button, a pointing device, an electronic card reader, a coin input slot, a paper money input slot, a barcode reader, a scanner, a payout slot and/or a receipt printer, for example. The wager may including a Singles bet, a Doubles bet, an Each Way bet and combinations thereof, for example.

The present invention may also be viewed as a game of chance, comprising the steps of accepting at least one of a wager and a selection of a predicted outcome of a competitive activity; randomly selecting an actual outcome of the competitive activity according to predetermined odds; accessing one of a plurality of video sequence that shows the randomly selected actual outcome of the competitive activity, and showing the accessed one of the plurality of video sequence on a display.

The present invention is also a machine-readable medium having data stored thereon representing sequences of instructions which, when executed by a computing device, causes said computing device to enable a game of chance to be played, by performing the steps of accepting both a wager and a selection of a predicted outcome of a competitive activity; randomly selecting an actual outcome of the competitive activity according to predetermined odds; accessing one of a plurality of video sequence that shows the randomly selected actual outcome of the competitive activity, and showing the accessed one of the plurality of video sequence on a display.

According to another aspect thereof, the present invention is a remotely updateable network of gaming terminals, comprising a plurality of gaming terminals; a local controller coupled to the plurality of gaming terminals; a local update database coupled to the local controller; a central server coupled to the local controller over a computer network, and a central update database, the central update database storing updates for the local controller and/or for at least one of the plurality of gaming terminals, wherein the local controller is configured to access the central server, to download the updates from the central update database, to install the downloaded updates for the local controller and to store the downloaded updates for at least one of the plurality of gaming terminals in the local update database and wherein the plurality of gaming terminals are configured to access the local update database and to download and install the downloaded updates stored therein.

Each of the plurality of gaming terminals may be associated with a unique identifier and the central update database may also store the unique identifier of each of the at least one of the plurality of gaming terminals to receive the update. The updates may include software updates to the local controller and/or at least one of the plurality of gaming terminals. The updates may include updated content for at least one of the plurality of gaming terminals. Such updated content may include a video sequence, animation and/or graphics, for example. The local controller may be configured to access the central server and the central update database at a predetermined time. The local controller may be configured to periodically reset itself and to subsequently search the local update database for recently downloaded updates for the local controller and at least one of the plurality of gaming terminals. One or more of the plurality of the gaming terminals may be configured to access the local controller and the local update database upon startup and to automatically download and install any available updates stored in the local update database.

The present invention is also a method of remotely updating a plurality of geographically distributed gaming terminals, comprising the steps of accessing a central server over a computer network; querying a central update database coupled to the central server to ascertain whether any updates for at least one of the plurality the gaming terminals are stored in the central update database; downloading any stored updates for the at least one of the plurality of gaming terminals to a local update database, the local update database being local to at least one gaming terminal; accessing the local update database and installing any downloaded updates in at least one gaming terminal.

The querying step may be carried out by a local controller coupled to a grouping of gaming terminals. The querying step may be carried out at a predetermined time interval and/or responsive to a predetermined event, for example. For example, the predetermined event may include a rebooting or resetting of the local controller. The accessing and installing steps may be carried out upon startup of the gaming terminals, for example. A step of associating each update with at least one of the plurality of gaming terminals may also be carried out. The updates may include software updates to the local controller and/or at least one of the plurality of gaming terminals. The updates may include updated content for at least one of the plurality of gaming terminals, such as video sequences, animations and/or graphics.

DESCRIPTION OF THE INVENTION

Figure 1:
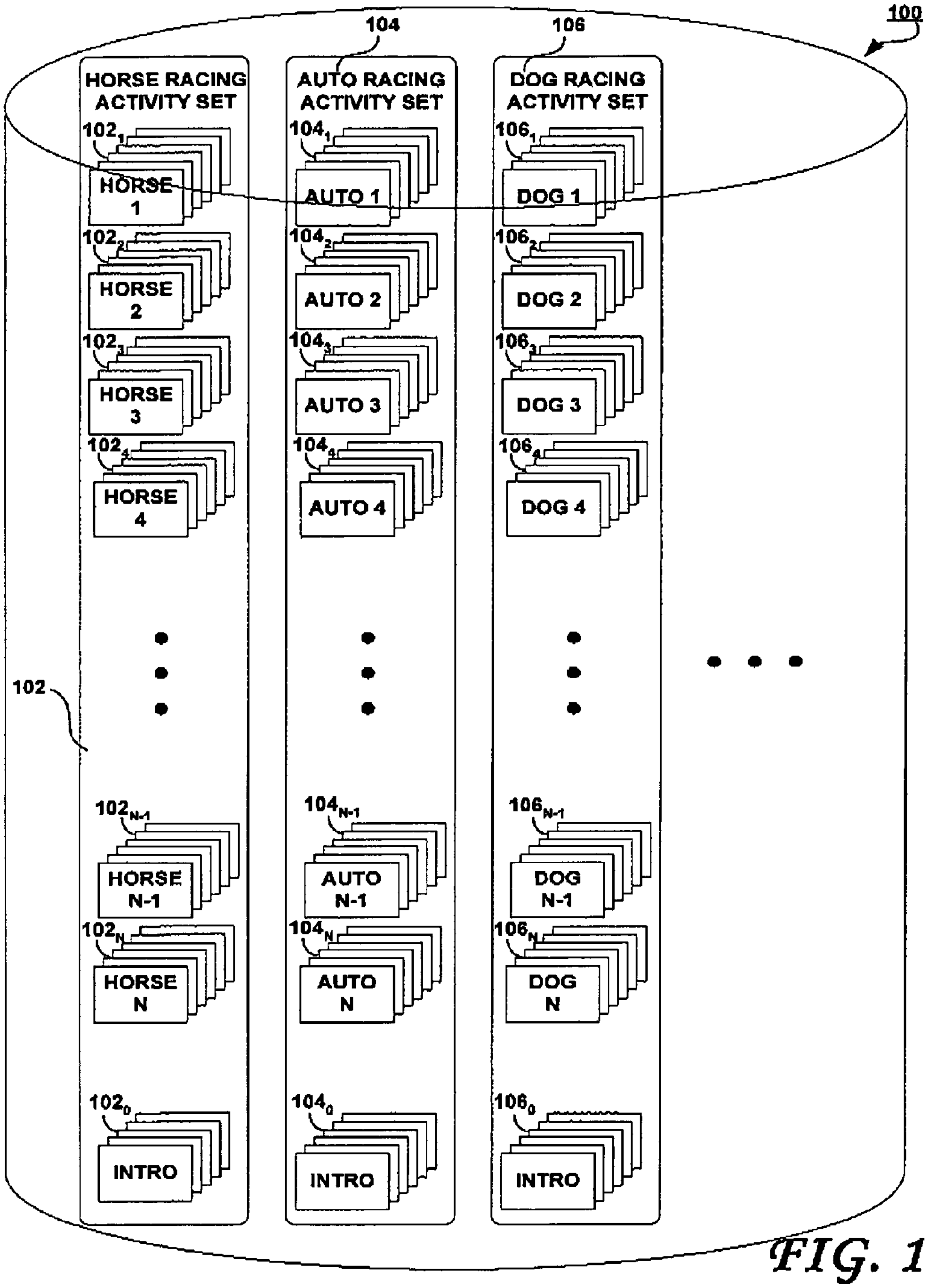
FIG. 1 is a diagram of a library of video sequences according to an embodiment of the present invention.

FIG. 1 shows a library 100 of video sequences according to an embodiment of the present invention. As used herein, the term "video sequences" encompasses not only filmed sequences (filmed with a movie or video camera, for example), but also includes computer and/or hand rendered animation, graphics and/or any visual, audio, tactile or sensory perceptual effects. As shown therein, the library 100 of video sequences may be logically organized into a plurality of activity sets. For ease of illustration, only three activity sets 102, 104 and 106 are shown in the library 100, although it is understood that a greater or lesser number of activity sets may be included within the library 100 or accessible thereto. Each activity set 102, 104 and 106 of the library 100 may be associated with a separate activity. In the example of FIG. 1, activity set 102 is associated with horse racing, activity set 104 is associated with auto racing and the activity set 106 is associated with dog racing. Each activity set 102, 104 and 106, according to the present invention, includes a plurality of sequentially numbered subsets. For example, the horse racing activity set 102 may include sequentially numbered subset $\mathbf{102}_1$, $\mathbf{102}_2$, $\mathbf{102}_3$, . . . $\mathbf{102}_{N-1}$ and $\mathbf{102}_N$. In turn, each of the sequentially numbered subsets $\mathbf{102}_1$, $\mathbf{102}_2$, $\mathbf{102}_3$, . . . $\mathbf{102}_{N-1}$ and $\mathbf{102}_{N\,may}$ include a plurality of like numbered video sequences (or animations or other dynamic graphical representation) drawn to the associated activity; namely, horse racing for the horse racing activity set 102. For example, subset $\mathbf{102}_3$ may include a predetermined number of different video sequences of a number 3 horse wining a horse race from among a field of N other horses. For example, subset $\mathbf{102}_3$ may include a dozen (or any number of) different video sequences of various horse and jockey combinations, all bearing the number 3 and all winning the race. Similarly, subset $\mathbf{102}_2$ may include a dozen video sequences of various horse and jockey combinations, all bearing the number 2. Each such video sequence shows a number 2 horse winning the race. Likewise, the car racing activity set 104 may include a plurality of sequentially numbered subsets $\mathbf{104}_1$, $\mathbf{104}_2$, $\mathbf{104}_3$, . . . $\mathbf{104}_{N-1}$ and $\mathbf{104}_N$. For example, subset $\mathbf{104}_2$ may include a dozen (or any number) of video sequences showing a number 2 car winning a race from among a field of N (where N is any number) other cars. One of the video sequences included in the subset $\mathbf{104}_2$ may show a red number 2 car winning the an auto race, whereas another of the video sequences within the same subset may show a yellow car bearing the number 2 winning the race. Likewise, subset $\mathbf{104}_4$ of activity set 106 (drawn to dog races) includes a plurality of different but like numbered video sequences of a number 4 dog winning a dog race from among a field of N other dogs. Any number of activity sets may be provided in the library 100 including, for example, activity sets drawn to boat races, track and field events, skiing events or most any competitive activity.

Similarly, each of the activity sets 102, 104, 106 and the like may include an intro subset, the intro subset including one or more introductory video sequences. For example, the horse racing set 102 may include an intro subset $\mathbf{102}_0$ that includes a plurality of introductory video sequences that show a horse race up until the last lap, for example. For instance, one of the video sequences of the intro subset $\mathbf{102}_0$ may show the beginning of a horse race at Churchill Downs, and another at the Kentucky Derby and yet another video sequence may show a horse race at some other location for variety. The introductory video sequences of the intro subset $\mathbf{102}_0$ may also show the (virtual) horse race unfolding in different ways, with different horses initially in the lead and different horses initially trailing behind. Similarly, the intro subsets $\mathbf{104}_0$ and $\mathbf{106}_0$ include introductory video sequences of auto and dog races, respectively. The library 100 may be stored in database form and on a random access medium that enables high quality video and audio tracks to be provided for the player.

The present invention, although drawn to wagering on activities that traditionally favor those with a deep understanding or special knowledge of the activity rules, and/or specific participants therein, is nevertheless a pure game of chance. Indeed, although a player may have a great understanding of the dynamics of horse racing, that knowledge has no effect upon the actual outcome of the game and does not further his or her chances of winning. According to an embodiment of the present invention, the present game of chance may include a step of presenting a player with a selection of activities, as shown at S51 in FIG. 5. This selection of activities may be presented to the player on a display screen (as shown at 212 in FIG. 2), for example. For example, the player may be presented with the list Horse Racing; Auto Racing, and Dog Racing and may be invited, by appropriate display prompts, to enter his or her selection. Each of the activities listed above may further include further choices, such as Le Mans, Paris-Dakar or Winston Cup, in the case of auto racing, for example. Once the player has selected an activity (let's say, Horse Racing, for example), he or she may be invited to select a predicted outcome from among a predetermined field of horses, as shown at S52. Short selected video sequences may be shown to the player to assist him or her to select a predicted outcome—that is, the horse (say, horse number 3) that the player believes will win the upcoming horse race. The player may concurrently be shown the odds (such as those shown in FIG. 5, for example) associated with each of the entrants in the upcoming race. Next, the player may be invited to place a wager on his or her selection, as also shown at S52. The wager may either be a real wager (a money bet) or a merely a bet for points or for some other incentive. The wager may be placed by entering paper money in an appropriate slot, by entering coins in a coin slot. Alternatively, the wager may be placed on a debit, credit or other machine-readable card or any form of electronic money.

After the player has made his or her activity selection, wager and has entered the predicted outcome of the selected activity, the system according to the present invention may select the actual outcome of the selected activity, as shown at S53. A random number generator may be employed to generate a random number to select the actual outcome of the player-selected activity, as discussed in detail below relative to FIGS. 4 and 6. Alternatively, the selection of the actual outcome of the selected activity may be made before the player selects any activity, has placed any wager or has selected any predicted outcome, as the actual outcome is simply a random number, which may be generated prior to any player interaction. For example, if the random number generator generates a number 2, then either the 2 horse will be the winner of the upcoming horse race (if horse racing is the player-selected activity), the 2 car will be the winner of the upcoming car race (if auto racing is the player-selected activity) or the 2 dog will be the winner of the upcoming dog race (if dog racing is the player-selected activity) and so forth. Alternatively, the random generator 305 may be configured to generate a random number within a predetermined range, such as from 1 to 80. Selected numbers within the range may be assigned to selected entrants, according to the predetermined odds. In any event, the number upon which the actual outcome of the race is selected must be a random number, even if the random number is processed through a fixed algorithm or matched against a table correlating the random number generated to the actual outcome of the race according to the predetermined odds for the race.

Figure 5:
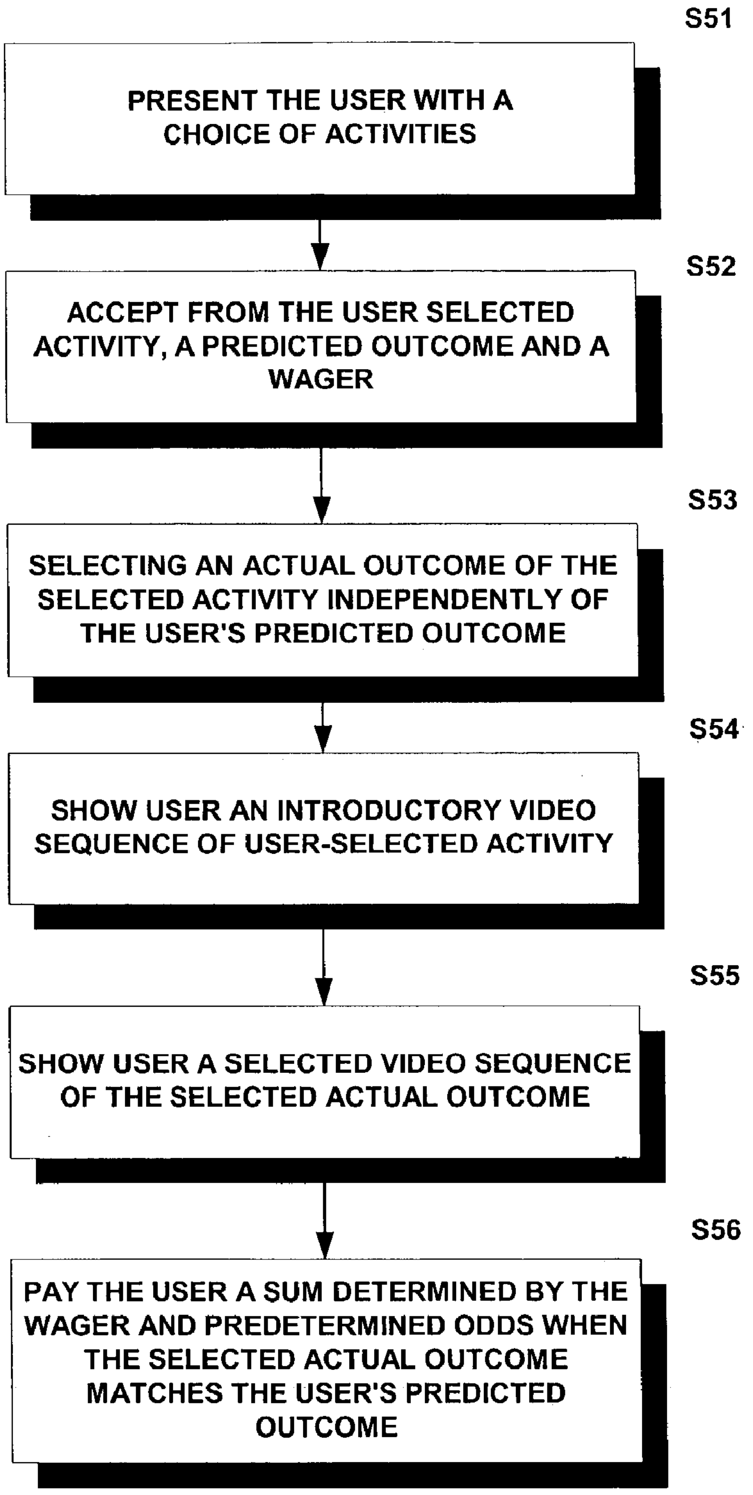
FIG. 5 is a flowchart of a method for implementing an electronic game of chance, according to an embodiment of the present invention.

The player may then be presented with an introductory video sequence of the selected activity, as shown at S54 in FIG. 5. That is, the player may be shown the beginning of a horse race if the player-selected activity is horse racing. The introductory video sequence may be selected from among the plurality of video sequences of intro subset $\mathbf{102_0}$. Indeed, to keep up the player's interest from game to game, it may be preferable that the same introductory video sequence not be shown each time the game is played. The introductory video sequence shown to the player may be randomly selected or the system may simply step through each of the plurality of introductory video sequences each time the game is played. Preferably, the introductory video sequence heightens the player's interest as the race unfolds, perhaps culminating (right before showing the video sequence of the selected actual outcome) in a tight race. Thereafter, the present invention provides for showing the player a video sequence of the winning horse, auto or dog, depending upon the selected activity, as noted at S55. The video sequence of the winning horse, according to the present invention, may be a video sequence of the preselected video sequence of the selected actual outcome of the player-selected activity. That is, the video sequence shown to the player after the showing of the selected introductory video sequence is one of the video sequences of the activity subset that corresponds to the selected actual outcome. For example, if the random number generated is 2 and the player-selected activity is horse racing, the player will be shown one of the video sequences of activity subset $\mathbf{102_2}$. Preferably, the video sequence showing the actual outcome of the race is concatenated (shown immediately after) with the introductory video sequence, so that the concatenated video sequence appears seamless. Lastly, if the predicted outcome selected by the player matches the randomly selected actual outcome of the race, the player may be rewarded by paying out a sum (either money or other value), the sum paid out to the player being determined based upon the wager placed by the player and predetermined odds for the winning competitor (horse, car, dog, etc.), as shown at S56.

In contradistinction with an actual horse, dog or auto race (for example), the actual outcome of a virtual race according to the present invention is wholly independent of the skill and/or knowledge of the player or of any of the virtual participants thereof. It is a pure game of chance and the actual outcome cannot in any way be influenced by the player, either before or after wagering and/or selecting an activity set. The present invention gives the player the all the excitement but only the illusion of a real authentic race (such as the player might experience, for example, at an Off Track Betting (OTB) facility).

According to the an embodiment of the present invention, no further wager may be accepted after the introductory video sequence $\mathbf{102_0}$, $\mathbf{104_0}$, $\mathbf{102_0}$ . . . of the selected activity is shown to the player.

Figure 2:
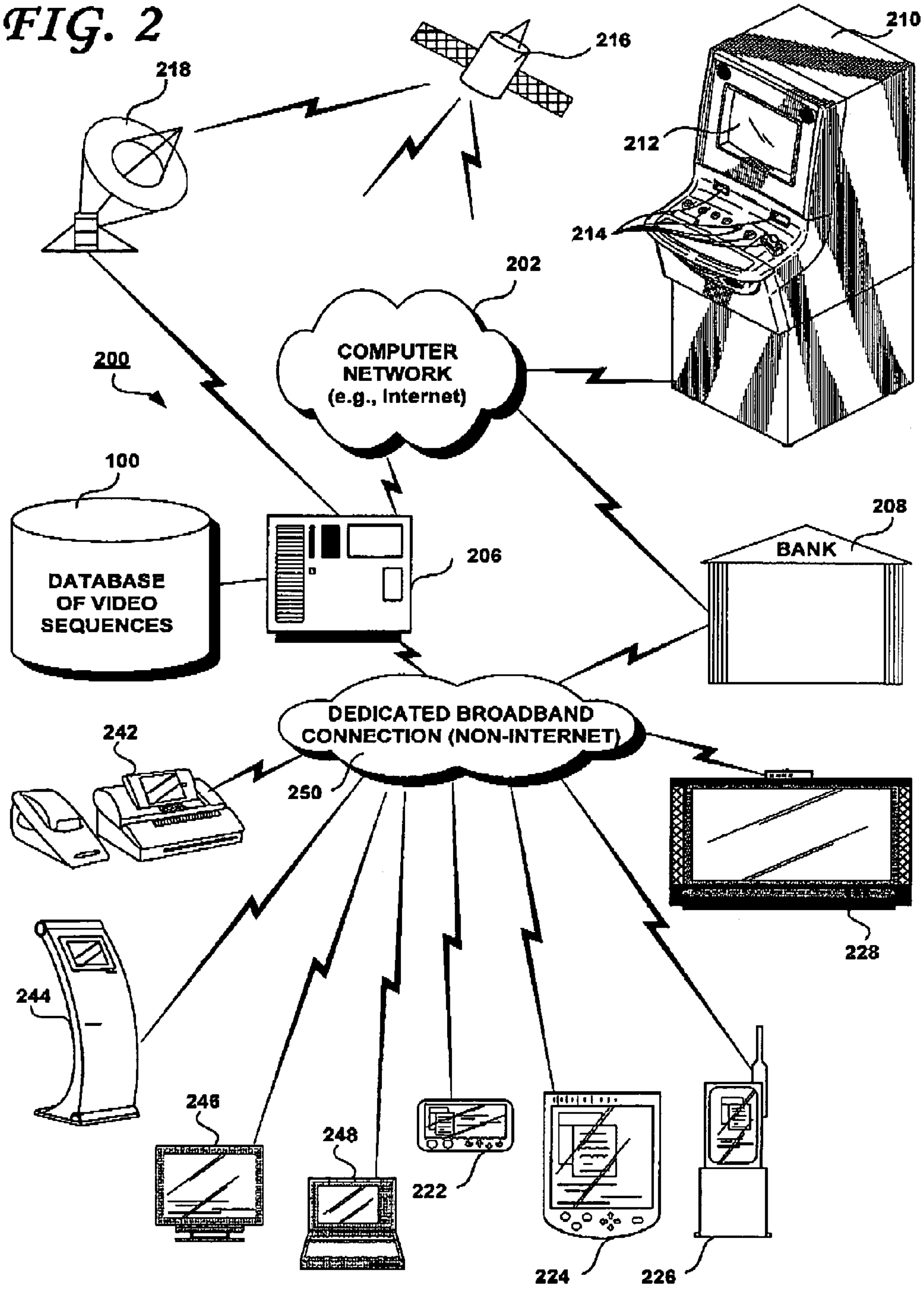
FIG. 2 is a functional block diagram of a system for providing electronic virtual races, according to an embodiment of the present invention.

FIG. 2 is a functional block diagram of a system 200 for providing electronic virtual races, according to an embodiment of the present invention. As shown therein, the system 200 may include a dedicated (standalone, for example) gaining terminal, such as shown at 210. The omamental features of the gaming tenninal 210 are further disclosed in commonly assigned and copending patent application filed on Mar. 22, 2001 and assigned serial number 29/138,934, now Design patent D449,346 entitled "Gaining Terminal", attorney reference CYBS5745D. Such a terminal 210 may include the library of video sequences 100 shown in FIG. 1 as well as a display 212 and player interaction means 214. For example, the player interaction means 214 may include an electronic card reader, a coin input slot, a paper money input slot, a barcode reader, a scanner and/or a receipt printer and/or any functionality necessary to accept user input and pay out any winnings to the player. The display 212 is preferably a high quality video display configured to provide the player wit a realistic gaming experience as he or she views the selected video sequences.

The gaming terminal may be coupled to a computer network, as shown at 202. For example, the computer network 202 may include the Internet. The gaming terminal 210 need not include an internal copy of the library 100 of video sequences. Indeed, such a library may be maintained externally to the gaming terminal 210, or externally to any device used to practice the present invention. An example of an external database of video sequences may be found at 100. The external library 100 is shown in FIG. 2 coupled to a server 206, itself connected to the computer network 202 and/or to another dedicated broadband network, such as shown at 250. Preferably, the communication channel between the server 206 and the gaming terminal 210 or any device used by a player to play the present game is a broadband connection of sufficient bandwidth to support multiple high quality on demand video streams simultaneously. For example, the selected video sequences may be transmitted from the server 206 to a satellite transmitter 218 to a satellite 216 and back down to one or more gaming terminals or devices and/or servers 206. One advantage of an external database of video sequences is that the video sequences may be changed and/or updated at will without necessitating a corresponding update of each installed gaming terminal. As wagers may be placed by debit, credit or smart cards, the gaming terminal 210 may also be coupled to one or more banks 208, enabling wagers to be debited from and payments made to such cards or to any other form of electronic money.

The present invention need not only be played on a dedicated gaming terminal as shown at 210. Indeed, a variety of other devices may be configured to offer the player a realistic gaming experience, including both wired and wireless devices, both desktop and portable. For example, the present invention may be practiced on a dedicated desktop terminal 242, an Internet kiosk 244, a personal computer 246, a laptop 248 or wireless devices such as video capable pagers, Personal Digital Assistants (PDA) 224, mobile telephones 226 and/or via interactive televisions, such as shown at 228 and/or other devices 222. Generally, the present invention may be practiced on any device configured to show selected video sequences and to accept some form of user input.

Figures 3, 4:
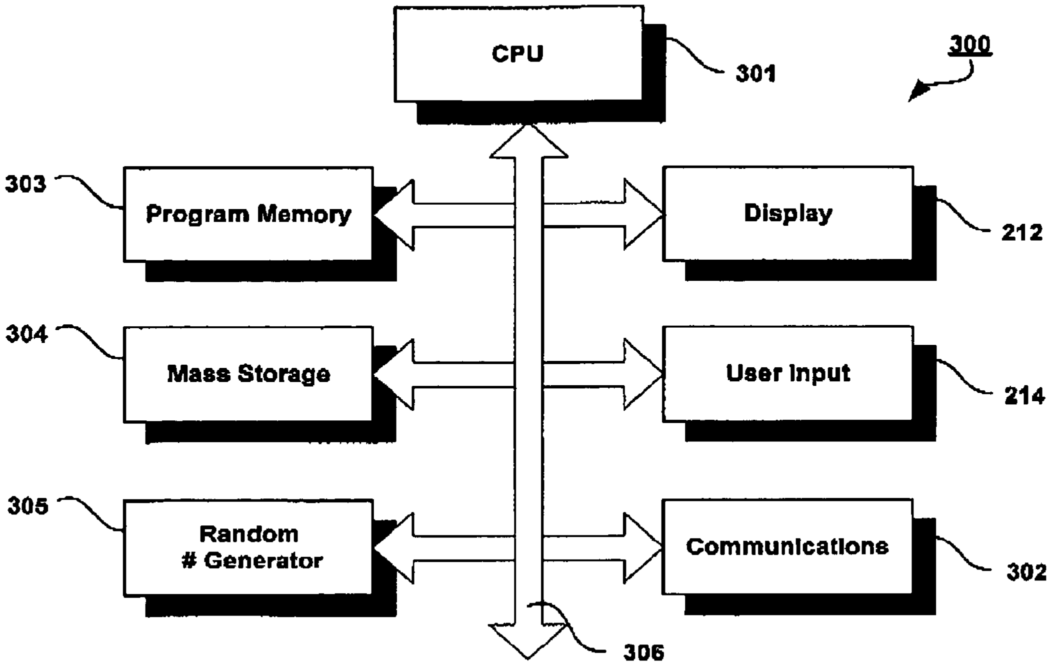
FIG. 3 is a block diagram of a gaming terminal suitable for carrying out the present invention.
FIG. 4 is a chart of representative odds suitable for use with the present invention.

FIG. 3 shows the architecture of a gaming terminal 210 or other device configured to enable a player to practice the present invention. As shown, such a device 300 may include a central processing Unit (CPU) 301, memory 303 (such as Dynamic Random Access Memory, for example) to execute a program embodying the present invention and to store working data, mass storage 304 such as a magnetic hard disk and/or optical memory (for example), a communication device 302 to enable communication with one or more of the computer networks 202 and 250, interfaces 214 to the user input means and a display monitor 212, and a random number generator 305 to select the video sequences within the library 100. The random number generator 305 may be a true hardware random number generator, based on, for example, thermal noise from a resistor (Johnson Noise) to thereby generate a true random, non-deterministic stream of bits that may be used to select the video sequences shown to the player. Each of the elements 301, 302, 303, 304, 305, 212 and 214 are advantageously coupled to one another via a common bus structure, as shown at reference 306.

FIG. 4 is a table showing exemplary odds associated with each horse in the horse race activity set 102 shown in the video sequences of the library 100 of FIG. 1. FIG. 4 shows exemplary odds for eight horses. However, odds for a greater or lesser number of horses (dogs, boats, skiers, etc . . . ) may be developed and implemented within the context of the present invention. For example, as shown in FIG. 4, the odds for the 4 horse to win is 9/2 or 4.5/1 in this example. Therefore, if a player places a £1 (or US$1 or whatever currency is used), the player will receive his or her original £1 stake plus winnings of £4.5 if the 4 horse wins the virtual race. The odds shown in FIG. 4 do not exactly reflect the chances of a horse winning since the odds and the average chance of a player winning are preferably calculated such that the operator maintains a margin (in the exemplary case shown, about 30%). For example, to maintain the 30% operator margin for horse 4, the player should be given a 12.7% chance of winning, even though to get all his or her money back the 9/2 odds equates to approximately an 18.2% chance of winning. In this example, therefore, a player will see horse 4 winning on average every 8 races. Therefore, if the player bets $1 on this horse on every race, the cost to the player will be $8 and the player will gain $5.5 in payback, comprising $4.5 winnings and $1 stake. In this case, the operator gains $2.5, which corresponds to a 31.25% margin. Other margins and/or odds may readily be implemented within the context of the present invention.

According to an embodiment of the present invention, the random number generator 305 may be configured to generate a random number between a predetermined range, such as from 1 to 80 (for a field of 8 horses, for example). A conversion table or a fixed algorithm may then split the 1-80 range according to the odds for each horse. For example, numbers 1-22 might correspond to horse 1, numbers 23-33 might correspond to horse 2, numbers 34-50 might correspond to horse 3, numbers 51-60 might correspond to horse 4, numbers 61-63 might correspond to horse 5, numbers 64-70 might correspond to horse 6, numbers 71-76 might correspond to horse 7 and numbers 77-80 might correspond to horse 8. Therefore, as the random number generator 305 generates a random number between 1 and 80, the range of numbers assigned to each horse (according to the odds assigned to each horse) insures that the winning horse is selected according to the odds. For example, if the random number generator 305 generates the number 37, horse 3 will be selected as the winning horse (as the number 37 falls within the 34-50 range for the 3 horse described above) and a video sequence showing the 3 horse winning the race may be shown to the player. For example, one of the plurality of video sequences in activity subset 102$_3$ of FIG. 1 may be shown to the player. According to the present invention, the winning horse (car, boat, dog, skier, etc.) selection is uniquely dependent upon the random number generated by the random number generator 305 and the generated number (and hence the selection of the winning horse, car, dog and the like and the corresponding video sequence) cannot be changed to reflect any dynamic feature such as House current profit, historical data or player skill. Hence, the present invention may be termed a fixed odds, non-skill game.

Figure 6:
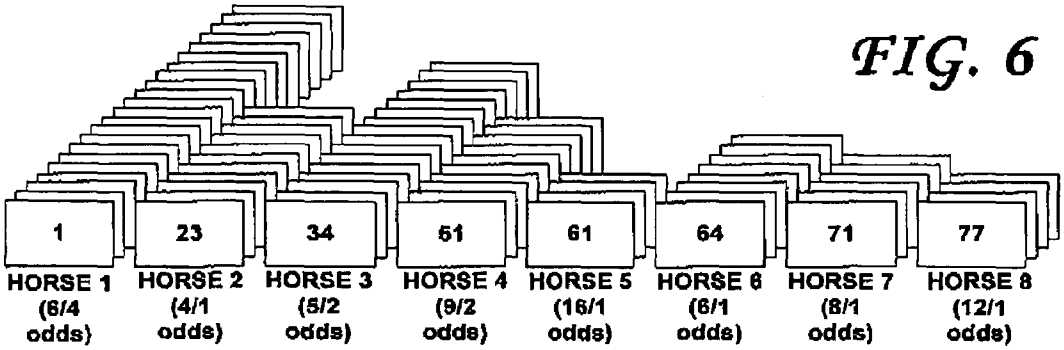
FIG. 6 shows a plurality of individually and sequentially numbered video sequences conforming to predetermined odds, according to another embodiment of the present invention.

According to another embodiment of the present invention, the number of video sequences of each horse (car, boat, etc.) correlates directly with the odds assigned to each horse. As shown in FIG. 4, for a field of eight horses (dogs, cars, etc.), there may be a total of, for example, 80 video sequences. To reflect the odds assigned to each entrant, the number of videos for the short odd (favorite) horse is greater than the number of video sequences showing the long odds (long shot) horse winning the race. Returning now to the table shown in FIG. 4, for the 1 horse whose odds are 6/4, fully twenty-two of the eighty video sequences may be video sequences showing the 1 horse winning the race. Twenty-two video sequences out of eighty such sequences correspond to the 6/4 odds assigned to that horse. Similarly, there may be only three video sequences showing the long odds (16/1) horse number 5 winning the race. Therefore, the random number generator 305 need only generate a random number in the specified range (1-80) and the system 200 need only show the numbered video corresponding to the generated random number. Turning now to FIG. 6, a plurality of individually and sequentially numbered video sequences are shown. The number of video sequences for each horse is shown in the table of FIG. 4. For example, if the random number generator 305 generates a 66, the system 200 would then show the video sequence numbered 66 to the player. The video sequence numbered 66, as suggested by FIG. 6, shows the 6 horse winning the race, as do all video sequences from video sequence number 65 to video sequence number 70. By skewing the number of video sequences according to the odds for each horse, no conversion of the generated random number may be necessary.

Other methods of selecting the winner of the race and showing a video sequence thereof to the player may be developed. It is to be understood, therefore, that other methods of selecting the winner of the race and/or the video sequence to be shown to the player may be devised and implemented without, however, falling outside of the scope of the present invention.

The present invention, moreover, is not limited to the type of bet that may be placed. For example, while the foregoing focused on what is called a "Single" bet; that is, a bet that a particular horse (dog, car, boat, etc.) will win a particular race, the present invention is not limited thereby. Indeed, the betting may be of any level of complexity and is independent of the random number generated and/or the video sequence selected and/or shown to the player. For example, the present invention readily supports a "Single" bet that a particular horse will be placed (i.e., come in 1st or 2nd place for an eight horse race). Another betting possibility is what is commonly termed "Each Way". An "Each Way" bet is a "Single" bet where the player bets on a single horse to win (1st stake) and for the same horse to be placed (2nd stake). Thus, a $1 "Each Way" bet on horse 2 will cost the player $2. If horse 2 wins, the player earns a win on the $1 to win and a win on the $1 to place. If, however, horse 2 comes in 2nd place, the player loses the $1 bet to win but wins on the $1 to place. Thus, the library 100 of video sequences may include video sequences showing both win and place entrants in various combinations. Alternatively, only the winning entrant may be shown to the player and the player simply informed of the placed entrants in the race via a voice or text message.

For example, the player may also place a "Doubles" bet, which includes two "Single" bets on different races, with the winnings from the first race being placed on the chosen horse in the second race. The advantage is that the odds if both horses win are better than if the player had placed two "Single" bets on the same horses (car, dog, boat, etc.). The downside of such a betting strategy is that both horses must win for the player to be paid. A "Double" bet may also be "Each Way". Various other betting schemes may be devised and implemented within the context of the present invention. Although the present invention has thus far been described relative to races, the present invention is not limited thereto. Indeed, the present invention is also applicable to any game that is able to make us of a library of video and/or graphics sequences such as described above. For example, even bingo and/or lottery games may be adapted to video and/or computer graphics formats and are well suited to the methods and/or systems described herein.

Figure 7:
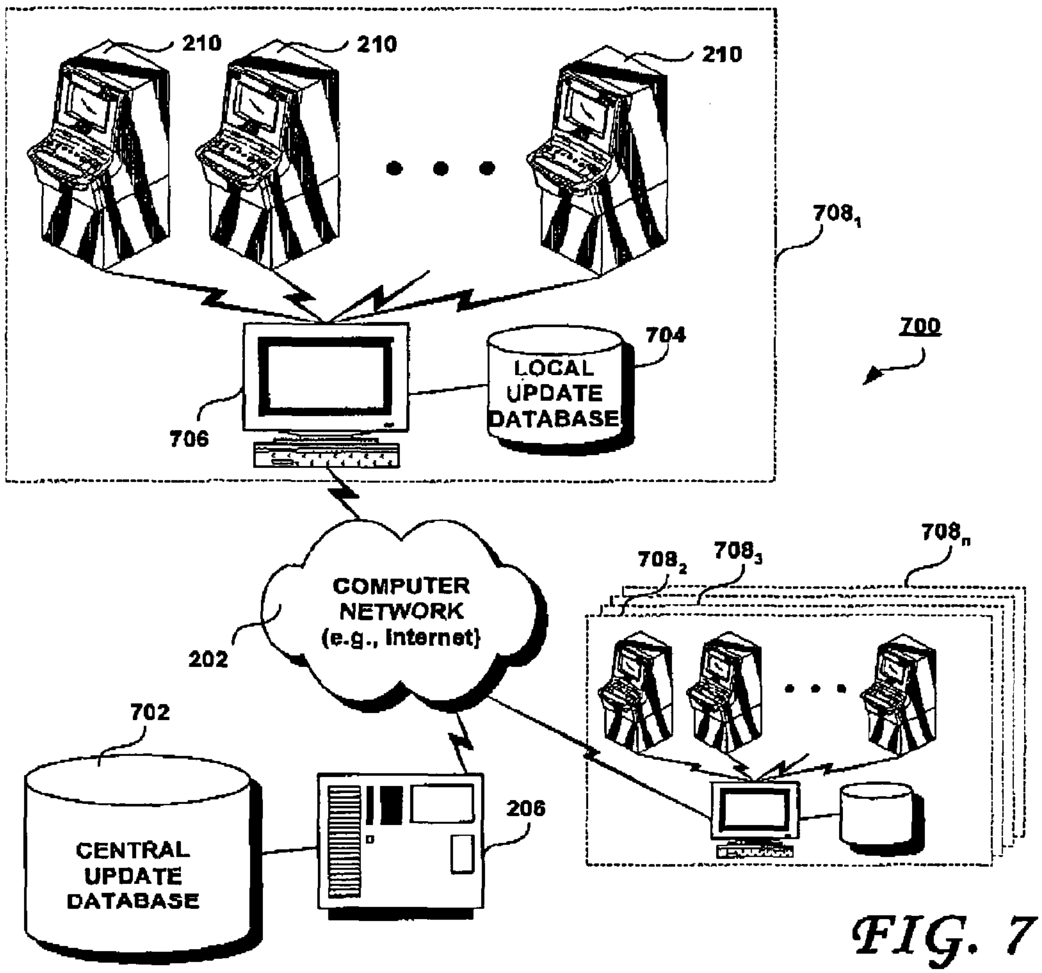
FIG. 7 is a block diagram of a system for providing and updating virtual races and games, according to an embodiment of the present invention.

FIG. 7 is a block diagram of a system 700 for providing and updating virtual races and games, according to an embodiment of the present invention. As shown therein the system 700 may include one or more gaming sites 708$_1$, 708$_2$, . . . , 708$_n$. Each gaming site may include one or more groupings of gaming terminals, such as shown at 210. The groupings may be representative of geographical co-location and/or representative of a common theme, characteristic or game. A gaming site, according to the present invention, is a logical grouping of one or more gaming terminals 210 (and/or other gaming devices and/or terminals), a local controller 706 (such as a workstation or personal computer, for example) and a local update database 704. The gaming terminals 210 of a gaming site 708$_1$, 708$_2$, . . . , 708$_n$ may be co-located or distributed across a predetermined geographical area. For example, each gaming site 708$_1$, 708$_2$, . . . , 708$_n$ may be located in a different hotel, casino, city and/or country. Each gaming terminal 210 is preferably individually identified, accessible and controllable by the local controller 706. Each gaming site 708$_1$, 708$_2$, . . . , 708$_n$ according to the present invention is coupled via a computer network 202 (including the Internet, for example, and/or leased lines and/or private broadband network, such as described relative to reference numeral 250 in FIG. 2). The network 202, in turn, is coupled to a game central server 206. The game central server 206 is coupled to a central update database 702.

The central update database 702 may include software updates (or completely new software applications) for the respective local controllers 706 of the gaming sites 708$_1$, 708$_2$, . . . , 708$_n$ as well as gaming software updates (or completely new gaming software) for each or selected ones of the gaming terminals 210 of all or selected ones of the gaming sites 708$_1$, 708$_2$, . . . , 708$_n$. For example, the local update database 702 may include software updates, new management reporting software and/or bug fixes to enable the local controllers 706 to update themselves. In addition, the central update database 702 may include files including new video sequences and/or new graphics to be displayed by each or selected ones of the gaming terminals 210 of all or selected ones of the gaming sites 708$_1$, 708$_2$, . . . , 708$_n$.

According to an embodiment of the present invention, the central update database 702 is loaded with the software updates and/or video and graphics files as described above, as well as the information as to which gaming machines 210 and which local controllers 706 should be updated with the new software packages and/or updated video and/or graphics files. Each gaming site 708$_1$, 708$_2$, . . . , 708$_n$ may be updated in the same manner or the updates may be targeted to any desired level of granularity. For example, only gaming sites 708$_1$, 708$_2$, . . . , 708$_n$ within a given area might be updated, or only some of the local controllers 706 and/or gaming terminals 210 thereof. At preset times (usually in the dark hours) the local controller 706 may contact the central server 206 and interrogate the central update database 702 coupled thereto to determine if there are any updates for itself or the local gaming machines 210 that it controls and/or has access to. If there is any update, the local controller 706 downloads the update software and/or video sequence and/or graphics files from the central server 206 over the communications network 202 and stores the downloaded update in the local update database 704.

Prior to the start of business (for example), the local controller 706 may be caused to (optionally) automatically re-boot and automatically search the local update database 704 coupled thereto for any new update software and/or video sequences and/or graphics. If the local update database 704 includes any new and/or updated software for the local controller 706, the local controller 706 installs the new and/or updated software in the correct directory thereof and sets itself up to run with the new software. Similarly, as each gaming terminal 210 is switched on prior to start of business, the switched on gaming terminal 210 searches the local update database 704 for any new and/or updated software and/or video sequence and/or graphics files for itself. If the local update database 704 has new software and/or video sequences and/or graphics files (content) intended for that gaming terminal 210, the new software and/or video sequences and/or graphics files are downloaded to the gaming terminal 210 which installs the new software and runs the new program(s) and/or enables the new video sequences and/or graphics to be displayed, as controlled by the gaming software. Note that, instead of the local controllers and/or gaming terminals 210 querying the central and local update databases 702, 704, a publish-subscribe model could be implemented, wherein the local controllers 706 and/or the gaming terminals subscribe to one or more predefined database events, such as software updates and/or new video or graphics files. Upon being loaded with new software and/or new files, the central and local update databases 702, 7804 may then consult a table to determine which local controller 706 and/or gaming terminal 210, if anyone, subscribed to such new software updates and/or files. Thereafter, the new software and/or files may be pushed to those devices having expressed an interest in receiving the updated software and/or files. Other methods of updating the local controllers 706 and/or gaming terminals 210 may occur to those of skill in this art, and all such update methods are deemed to fall within the purview of the present invention.

One advantage of the above-described methods and architecture of the system 700 is that any local controller 706 and/or gaming terminal 210 may be updated in response to customer needs for new games, to fix software failures or simply to add new virtual race selections. In this manner, different gaming terminals 210 may be remotely updated, programmed, and/or loaded with new games or play features. Thus, different games may be loaded on different gaming terminals at a single gaming site 708$_1$, 708$_2$, or 708$_n$. For example, one third of the gaming terminals 210 at a given gaming site may feature virtual horse games, another third may feature virtual racecar games and the other third of gaming terminals may be programmed to play lottery numbers games. Similarly, all (or selected) gaming terminals 210 in a given city may be remotely programmed to carry a game or games themed around the city's local football team, for example. The downloadable software features provide a wealth of flexibility to tailor games and terminal functions to meet local or national needs.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A remotely updateable network of geographically distributed gaming terminals, comprising:

a central server located at a central server site;

a plurality of gaming terminals located at a plurality of geographically distributed sites;

a local controller located at each of the geographically distributed sites, the local controller being coupled to the central server and to a selected number of the plurality of gaming terminals located at each of the plurality of geographically distributed sites;

a local update database at each of the geographically distributed sites and coupled to the local controller, and a central update database located at the central server site, the central update database storing updates assigned to the local controller and/or updates assigned to the plurality of gaming terminals, wherein the local controller is configured to access the central server, to receive the updates from the central update database, to install the updates assigned to the local controller and to store the updates assigned to the plurality of gaming terminals in the local update database and wherein the plurality of gaming terminals are configured to access the local controller and the local update database upon startup and to automatically search the local update database for any available assigned updates and to download and install any available assigned updates found as a result of searching the local update database.

2. The network of gaming terminals of claim 1, wherein each of the plurality of gaming terminals is associated with a unique identifier and wherein the central update database also stores the unique identifier of each of the plurality of gaming terminals to receive the update.

3. The network of gaming terminals of claim 1, wherein the updates include software updates to at least one of the local controller and the plurality of gaming terminals.

4. The network of gaming terminals of claim 1, wherein the updates include updated content for the at least one of the plurality of gaming terminals.

5. The network of gaming terminals of claim 4, wherein the updated content includes at least one of a video sequence, animation and graphics.

6. The network of gaming terminals of claim 1, wherein the local controller is configured to access the central server and the central update database at a predetermined time.

7. The network of gaming terminals of claim 1, wherein the local controller is configured to periodically reset itself and to subsequently search the local update database for recently received updates for the local controller and the at least one of the plurality of gaming terminals.

8. The network of gaming terminals of claim 1, wherein the updates implement a first theme on at least one of the plurality of gaming terminals located at a first one of the plurality of geographically distributed sites, and wherein the updates implement a second theme that is different from the first theme on at least one of the plurality of gaming terminals located at a second one of the plurality of geographically distributed sites.

9. The network of gaming terminals of claim 1, wherein the central server is configured to download first updates from the central update database to a first local update database and to download second updates that are different from the first updates from the central update database to a second local update database that is geographically remote from the first local update database.

10. The network of gaming terminals of claim 9, wherein the first updates implement a first theme on the gaming terminals coupled to the first local update database and wherein the second updates implement a second theme on the gaming terminals coupled to the second local update database.

11. A method of remotely updating a plurality of geographically distributed gaming terminals, comprising the steps of:

accessing a central server over a computer network;

querying a central update database coupled to the central server to ascertain whether any updates for at least one of the plurality the gaming terminals are stored in the central update database;

receiving over the computer network any stored updates for the plurality of gaming terminals in a local update database, the local update database being local to the plurality of gaming terminals;

accessing the local update database upon startup of the at least one of the plurality of gaming machines, automatically searching the local update database for any available assigned updates and downloading and installing any available assigned updates found as a result of searching the local update database.

12. The method of claim 11, wherein the querying step is carried out by a local controller coupled to a grouping of gaming terminals.

13. The method of claim 12, wherein the querying step is carried out at one of a predetermined time interval and responsive to a predetermined event.

14. The method of claim 13, wherein the predetermined event includes a re-booting or resetting of the local controller.

15. The method of claim 12, wherein the updates include software updates to at least one of the local controller and at least one of the plurality of gaming terminals.

16. The method of claim 12, wherein the updates include updated content for at least one of the plurality of gaming terminals.

17. The method of claim 16, wherein the updated content includes at least one of a video sequence, animation and graphics.

18. The method of claim 11, further comprising a step of associating each update with at least one of the plurality of gaming terminals.

19. The method of claim 11, wherein the updates in the accessing step implement a first theme on at least one of the plurality of gaming terminals located at a first one of the plurality of geographically distributed sites, and wherein the updates implement a second theme that is different from the first theme on at least one of the plurality of gaming terminals located at a second one of the plurality of geographically distributed sites.

20. The method of claim 11, further including steps of the central server downloading first updates from the central update database to a first local update database and downloading second updates that are different from the first updates from the central update database to a second local update database that is geographically remote from the first local update database.

21. The method of claim 20, wherein the first updates implement a first theme on the gaming terminals coupled to the first local update database and wherein the second updates implement a second theme on the gaming terminals coupled to the second local update database.

22. A remotely updateable network of geographically distributed gaming terminals, comprising:

a central server located at a central server site;

a plurality of gaming terminals located at a plurality of geographically distributed sites;

a local controller located at each of the geographically distributed sites, the local controller being coupled to the central server and to a selected number of the plurality of gaming terminals located at each of the plurality of geographically distributed sites;

a local update database at each of the geographically distributed sites and coupled to the local controller, and a central update database located at the central server site, the central update database storing updates assigned to the local controller and/or updates assigned to the plurality of gaming terminals, wherein the local controller is configured to access the central server, to receive the updates from the central update database, to store the updates assigned to the plurality of gaming terminals in the local update database and wherein the plurality of gaming terminals are configured to subscribe to selected predefined events within the local update database and wherein the local controller is configured, upon occurrence of one of the selected predefined events, to publish selected ones of the updates to those gaming terminals having subscribed thereto.

23. The network of gaming terminals of claim 22, wherein each of the plurality of gaming terminals is associated with a unique identifier and wherein the central update database also stores the unique identifier of each of the plurality of gaming terminals to receive the update.

24. The network of gaming terminals of claim 22, wherein the updates include software updates to at least one of the local controller and the plurality of gaming terminals.

25. The network of gaming terminals of claim 22, wherein the updates include updated content for the at least one of the plurality of gaming terminals.

26. The network of gaming terminals of claim 25, wherein the updated content includes at least one of a video sequence, animation and graphics.

27. The network of gaming terminals of claim 22, wherein the local controller is configured to access the central server and the central update database at a predetermined time.

28. The network of gaming terminals of claim 22, wherein the local controller is configured to periodically reset itself and to subsequently search the local update database for recently received updates for the local controller and the at least one of the plurality of gaming terminals.

29. The network of gaming terminals of claim 22, wherein the gaming terminals are configured to store and install the published updates to which they have subscribed.

30. The network of gaming terminals of claim 22, wherein the updates implement a first theme on at least one of the plurality of gaming terminals located at a first one of the plurality of geographically distributed sites, and wherein the updates implement a second theme that is different from the first theme on at least one of the plurality of gaming terminals located at a second one of the plurality of geographically distributed sites.

31. The network of gaming terminals of claim 22, wherein the central server is configured to download first updates from the central update database to a first local update database and to download second updates that are different from the first updates from the central update database to a second local update database that is geographically remote from the first local update database.

32. The network of gaming terminals of claim 31, wherein the first updates implement a first theme on the gaming terminals coupled to the first local update database and wherein the second updates implement a second theme on the gaming terminals coupled to the second local update database.

* * * * *